US009151206B2

(12) United States Patent
Van Nieuwstadt (10) Patent No.: US 9,151,206 B2
(45) Date of Patent: Oct. 6, 2015

(54) METHOD FOR DETERMINING SOOT MASS STORED WITH A PARTICULATE FILTER (75) Inventor: Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 982 days.

(21) Appl. No.: 13/036,753

(22) Filed: Feb. 28, 2011

(65) Prior Publication Data

US 2012/0216507 A1    Aug. 30, 2012

(51) Int. Cl.
*F01N 3/00*    (2006.01)
*F01N 11/00*    (2006.01)
*F01N 3/10*    (2006.01)
*F02D 41/02*    (2006.01)
*F01N 13/00*    (2010.01)
*F02D 41/14*    (2006.01)

(52) U.S. Cl.
CPC .............. *F01N 11/007* (2013.01); *F01N 3/101* (2013.01); *F01N 13/009* (2014.06); *F02D 41/029* (2013.01); *F01N 2550/04* (2013.01); *F01N 2560/025* (2013.01); *F01N 2560/14* (2013.01); *F01N 2900/1606* (2013.01); *F01N 2900/1624* (2013.01); *F02D 41/1441* (2013.01); *F02D 2200/0812* (2013.01); *F02D 2200/0814* (2013.01); *Y02T 10/22* (2013.01); *Y02T 10/47* (2013.01)

(58) Field of Classification Search
USPC .................... 60/274, 276, 295, 297, 301, 311
See application file for complete search history.

(56) References Cited

U.S. PATENT DOCUMENTS

| 5,752,387 | A | 5/1998 | Inagaki et al. | |
|---|---|---|---|---|
| 5,819,530 | A * | 10/1998 | Asano et al. | 60/277 |
| 6,490,857 | B2 * | 12/2002 | Sasaki | 60/278 |
| 6,738,702 | B2 | 5/2004 | Kolmanovsky et al. | |
| 6,952,918 | B2 * | 10/2005 | Imai et al. | 60/295 |
| 7,062,904 | B1 | 6/2006 | Hu et al. | |
| 7,159,384 | B2 * | 1/2007 | Otake et al. | 60/277 |
| 7,162,862 | B2 * | 1/2007 | Nagai et al. | 60/285 |
| 7,249,453 | B2 * | 7/2007 | Saito et al. | 60/277 |
| 7,281,369 | B2 * | 10/2007 | Emi et al. | 60/297 |
| 7,299,626 | B2 | 11/2007 | Barasa et al. | |
| 7,482,303 | B2 | 1/2009 | Bosteels | |
| 7,607,288 | B2 * | 10/2009 | Miyasako et al. | 60/277 |

(Continued)

FOREIGN PATENT DOCUMENTS

| EP | 0952323 | 10/1999 |
|---|---|---|
| EP | 1245817 | 10/2002 |

(Continued)

OTHER PUBLICATIONS

Partial Translation of Office Action of Chinese Application No. 201210043809.3, Issued May 5, 2015, State Intellectual Property Office of PRC, 8 Pages.

*Primary Examiner* — Thomas Denion
*Assistant Examiner* — Matthew T Largi
(74) *Attorney, Agent, or Firm* — Julia Voutyras; Alleman Hall McCoy Russell & Tuttle LLP (57) ABSTRACT

A method for determining soot mass oxidized during a particulate filter oxidation procedure is disclosed. In one example, soot mass is determined via an Arrhenius equation. The approach may provide cost savings and reliability improvements as compared to other ways of determining soot mass.

20 Claims, 5 Drawing Sheets

(56) References Cited

U.S. PATENT DOCUMENTS

| | | |
|---|---|---|
| 7,610,753 B2 * | 11/2009 | Kitahara .................. 60/295 |
| 2001/0045090 A1 * | 11/2001 | Gray, Jr. .................. 60/278 |
| 2005/0019578 A1 | 1/2005 | Bosteels |
| 2005/0072141 A1 * | 4/2005 | Kitahara .................. 60/297 |
| 2006/0168951 A1 * | 8/2006 | Opris .................. 60/297 |
| 2006/0179825 A1 | 8/2006 | Hu et al. |
| 2007/0220873 A1 | 9/2007 | Bosteels |
| 2009/0120071 A1 | 5/2009 | Gandhi et al. |
| 2009/0193796 A1 | 8/2009 | Wei et al. |
| 2010/0011749 A1 * | 1/2010 | Fujiwara et al. ............. 60/286 |
| 2011/0072783 A1 | 3/2011 | Hepburn et al. |
| 2011/0072784 A1 | 3/2011 | Hepburn et al. |
| 2011/0072787 A1 | 3/2011 | Hubbard et al. |
| 2011/0072788 A1 | 3/2011 | Ruona et al. |
| 2011/0072791 A1 | 3/2011 | Bidner et al. |
| 2011/0072792 A1 | 3/2011 | Bidner et al. |
| 2011/0072793 A1 | 3/2011 | Bidner et al. |
| 2011/0072794 A1 | 3/2011 | Van Nieuwstadt et al. |
| 2011/0072795 A1 | 3/2011 | Kerns et al. |
| 2011/0072796 A1 | 3/2011 | Van Nieuwstadt |
| 2011/0072797 A1 | 3/2011 | Van Nieuwstadt |
| 2011/0072799 A1 | 3/2011 | Bidner et al. |
| 2011/0072800 A1 | 3/2011 | Bidner et al. |
| 2011/0072801 A1 | 3/2011 | Lupescu et al. |
| 2011/0072802 A1 | 3/2011 | Bidner et al. |
| 2011/0072803 A1 | 3/2011 | Van Nieuwstadt et al. |
| 2011/0072804 A1 | 3/2011 | Van Nieuwstadt et al. |
| 2011/0073070 A1 | 3/2011 | Ruhland et al. |
| 2011/0073088 A1 | 3/2011 | Hubbard et al. |

FOREIGN PATENT DOCUMENTS

| | | |
|---|---|---|
| EP | 1319811 | 6/2003 |
| JP | 2001263053 | 9/2001 |
| JP | 2001263130 | 9/2001 |
| JP | 2004232544 | 8/2004 |
| JP | 2004251230 | 9/2004 |
| JP | 2006161572 | 6/2006 |
| JP | 2007291980 | 11/2007 |
| JP | 2008095603 A * | 4/2008 |
| JP | 2009030547 | 2/2009 |
| JP | 2009041386 | 2/2009 |
| JP | 2009079487 | 4/2009 |
| JP | 2009085054 | 4/2009 |
| JP | 2009228448 | 10/2009 |
| WO | 2008127755 | 10/2008 |

* cited by examiner

METHOD FOR DETERMINING SOOT MASS STORED WITH A PARTICULATE FILTER

BACKGROUND/SUMMARY

Carbonaceous soot may be a bi-product of some combustion processes. For example, carbonaceous soot may be produced by some diesel engines during higher engine load conditions. More recently, gasoline engines have incorporated directly injecting fuel into engine cylinders to improve engine performance and fuel economy. However, directly injecting fuel to engine cylinders has also increased the possibility of producing carbonaceous soot in gasoline engines. As a result, some manufacturers are considering placing particulate filters within the exhaust systems of gasoline engines.

Particulate filters can hold carbonaceous soot, but over time, the soot accumulated within the particulate filter can reduce exhaust flow through the exhaust system. Consequently, engine back pressure may increase, thereby reducing engine efficiency and fuel economy. Buildup of soot within the particulate filter can be controlled by periodically oxidizing the soot. Soot trapped in a particulate filter can be oxidized by elevating the temperature of engine exhaust gas flowing into the particulate filter and providing excess oxygen for oxidation. However, elevating engine exhaust temperatures may reduce engine fuel economy since the engine may be operated less efficiently to increase exhaust gas temperatures. Therefore, it may be desirable to limit soot purging or regeneration of the particulate filter to conditions where the particulate filter holds an amount of soot that warrants oxidation.

One way to determine whether or not timing is desirable for oxidizing soot held within a particulate filter requires measuring exhaust pressure upstream and downstream of the particulate filter. If a pressure difference greater than a threshold amount develops between the upstream and downstream pressure measurements, it is determined that there is sufficient soot mass for the oxidation process. Although determining a pressure difference within the exhaust system may be possible, adding pressure sensors to the exhaust system raises system cost. In addition, pressure sensors may not be as durable in the exhaust system as compared to other types of sensors.

The inventor here has recognized the above-mentioned disadvantages and has developed a method for determining operating a particulate filter, comprising: estimating soot mass oxidized from a particulate filter via first and second oxygen sensors; and indicating degradation of the particulate filter when a difference between the estimated soot mass oxidized from the particulate filter and a desired soot mass held in the particulate filter is greater than a threshold soot mass.

A mass of soot oxidized within a particulate filter can be determined in response to output of oxygen sensors. In one example, a mass of soot oxidized in a particulate filter is determined from an amount of oxygen that is consumed during soot oxidation. Oxygen sensors are typically included in the exhaust systems of gasoline engines to improve air-fuel control and three-way catalyst efficiency. Thus, a mass of soot held within a particulate filter may be determined via oxygen sensors that are in the engine exhaust for determining engine air-fuel control. Consequently, cost for a system to control particulate filter soot can be reduced since oxygen sensors can be used for more than a single purpose.

The present description may provide several advantages. In particular, the approach can reduce particulate filter system cost since oxygen sensors determine a mass of soot within a particulate filter rather than pressure sensors. In addition, particulate filter leakage may be determined with the approach. Further, the approach compensates for differences in oxygen sensor output to improve stored soot estimates whereas output of pressure sensors and particulate sensors may be influenced by the presence of the particulate filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
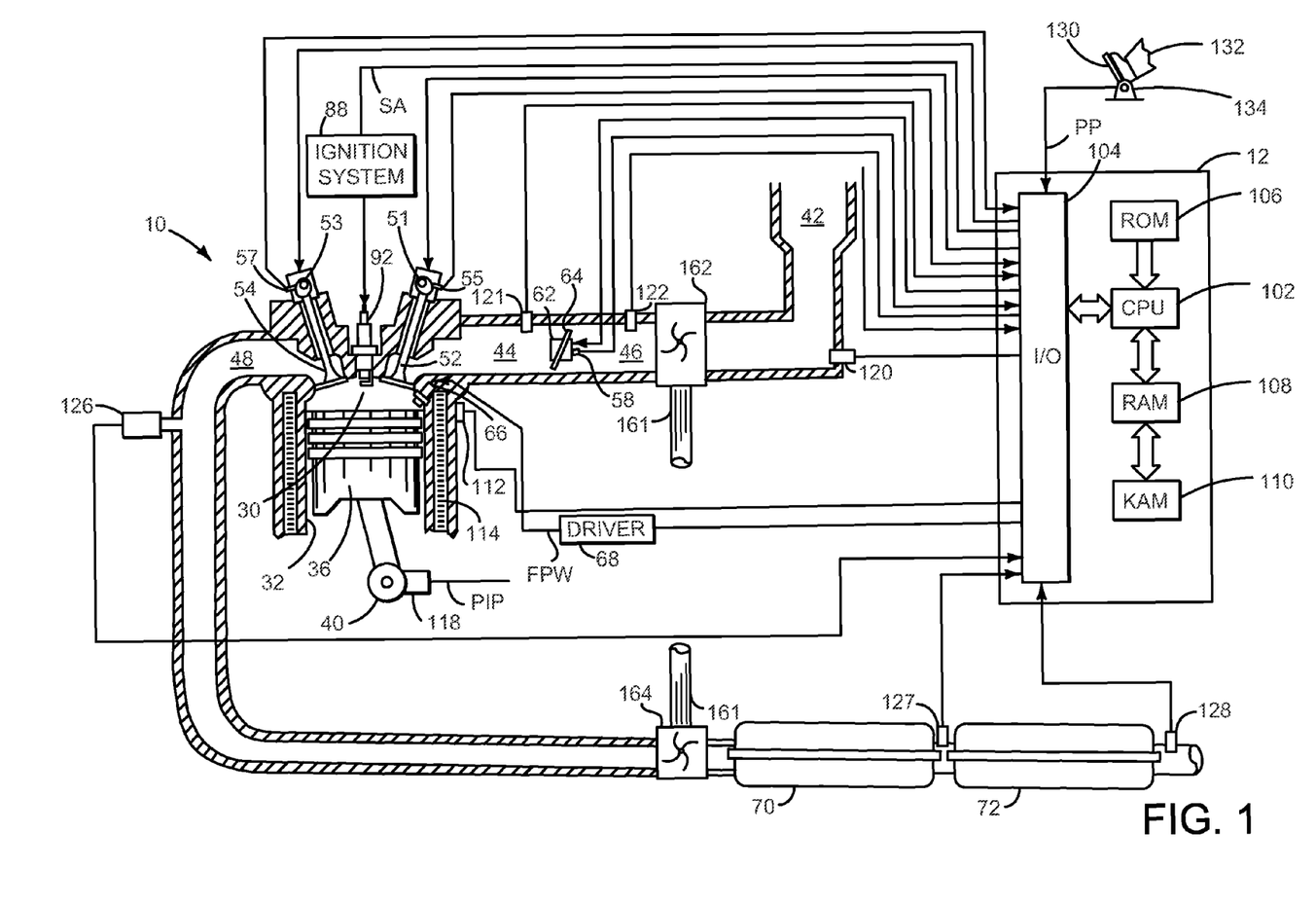
FIG. 1 shows a schematic depiction of an engine.
Figure 2:
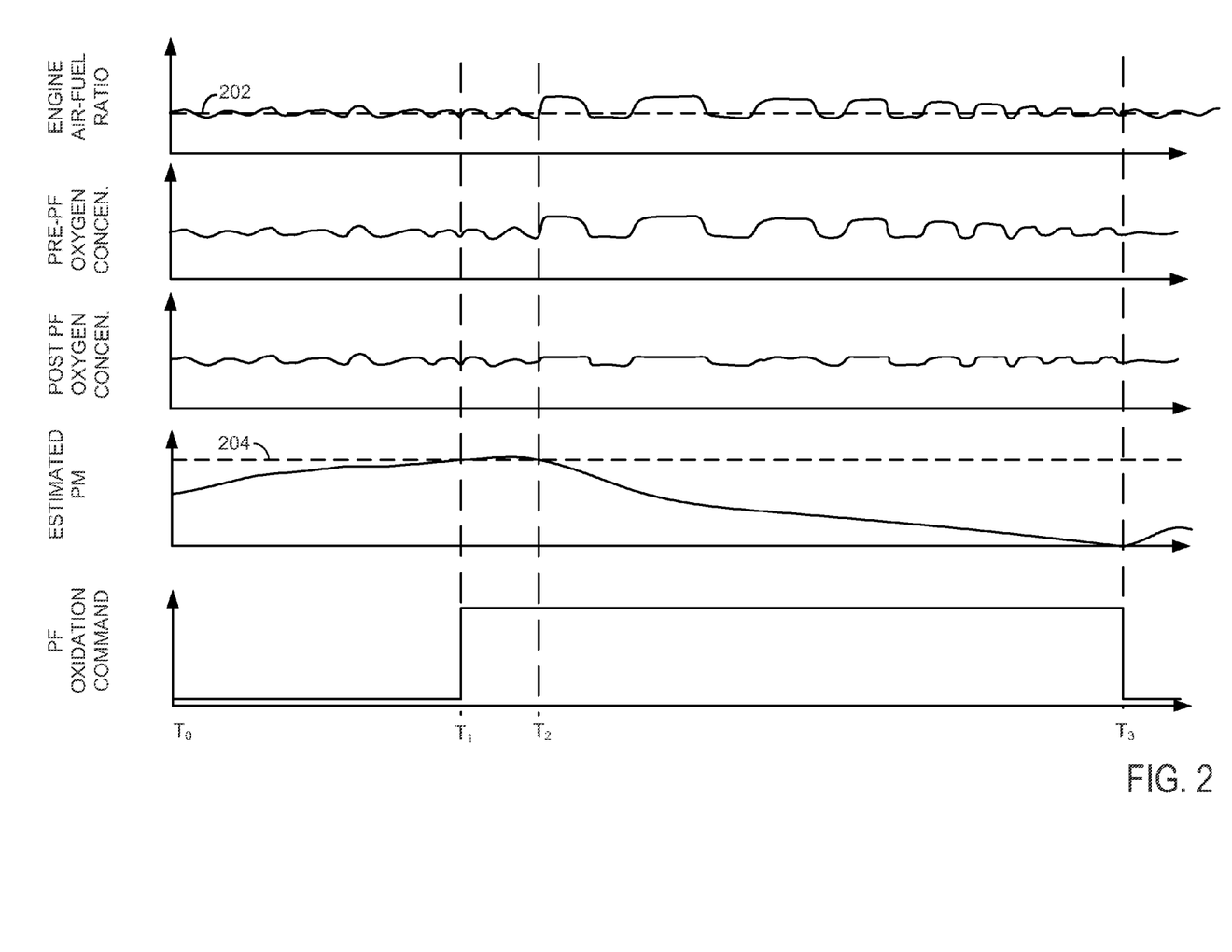
FIG. 2 shows signals of interest during oxidation of soot from a particulate filter.

The present description is directed to determining a soot mass oxidized within a particulate filter. FIG. 1 shows one example embodiment for a system that includes a particulate filter. The system includes spark ignition engine that may be operated with gasoline, alcohol, or a mixture of gasoline and alcohol. FIG. 2 shows prophetic signals of interest for a system that estimates soot mass with oxygen sensors. The signals may be realized with the system of FIG. 1 executing the methods of FIGS. 3-5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Exhaust gases spin turbine 164 which is coupled to compressor 162 via shaft 161. Compressor 162 draws air from air intake 42 to supply boost chamber 46. Thus, air pressure in intake manifold 44 may be elevated to a pressure greater than atmospheric pressure. Consequently, engine 10 may output more power than a normally aspirated engine.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. The engine exhaust system includes a second exhaust gas after treatment device 72 located downstream (e.g., in the direction of exhaust flow) of exhaust gas after treatment device 70. The exhaust system also contains universal oxygen sensors 127 and 128. In some examples, exhaust gas after treatment device 70 is a particulate filter and exhaust gas after treatment device 72 is a three-way catalyst. In other examples, exhaust gas after treatment device 70 is a three-way catalyst and exhaust gas after treatment device 72 is a particulate filter. In still further examples, a third exhaust gas after treatment device comprising a three-way catalyst may be positioned downstream of the second exhaust gas after treatment device.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, prophetic signals of interest during oxidation of soot from a particulate filter are shown. The signals may be provided by the system of FIG. 1 executing the methods of FIGS. 3-5. Five plots are shown relative to time, and each plot occurs at the same time as the other plots. Vertical markers $T_0$-$T_3$ indicate times of particular interest.

The first plot from the top of the figure shows engine air-fuel versus time. Horizontal marker 202 represents an oxygen concentration of stoichiometric air-fuel combusted by an engine. The engine air-fuel ratio moves leaner in the direction of the Y axis arrow. The engine air-fuel ration moves richer in the direction of the bottom of the first plot. The X axis represents time, and time increases from the left to the right.

The second plot from the top of the figure shows engine exhaust gas oxygen concentration as measured via an oxygen sensor at a location in an exhaust system upstream of an inlet of a particulate filter (PF). In this example, the oxygen concentration upstream of the inlet of the particulate filter follows the engine air-fuel ratio since there is no three-way catalyst positioned upstream of the particulate filter. In examples where a three-way catalyst is located upstream of the particulate filter, the oxygen concentration may exhibit a more filtered response since the three-way catalyst may use some exhaust gas oxygen to oxidize combustion bi-products. The concentration of exhaust gas oxygen increases in the direction of the Y axis and decreases in a direction of the bottom of the plot. The X axis represents time, and time increases from the left to the right.

The third plot from the top of the figure shows engine exhaust gas oxygen concentration as measured via an oxygen sensor at a location in an exhaust system downstream of an inlet of a particulate filter (PF). The concentration of exhaust gas oxygen increases in the direction of the Y axis and decreases in a direction of the bottom of the plot. The X axis represents time, and time increases from the left to the right.

The fourth plot from the top of the figure represents an amount of particulate matter (e.g., soot mass) estimated to be held within a particulate filter. In one example, the amount of particulate matter may be estimated based on engine speed, engine torque, engine fuel timing, and engine spark timing. In particular, empirical data stored in functions or tables may be indexed via engine speed, engine torque, engine fuel timing, and engine spark timing to output a mass flow rate of particulate matter. The mass flow rate of soot may be integrated over time to estimate soot mass held within the particulate trap. In some examples, the mass flow rate of soot from the engine may be multiplied by a filtering efficiency for the particulate filter to determine soot mass held within the particulate filter. The filtering efficiency may be estimated by indexing empirically determined filtering efficiencies that are indexed with filter temperature, filter mass flow rate, and soot flow rate. The soot mass held within the particulate filter increases in the direction of the Y axis. The X axis represents time, and time increases from the left to right. Horizontal marker 204 represents soot mass where it is desirable to oxidize soot held within the particulate filter.

The fifth plot from the top of the figure represents a control signal that initiates and ends a soot oxidation sequence. Soot oxidation is not commanded when the oxidation command is at a low level (e.g., near the bottom of the plot). Soot oxidation is commanded when the oxidation command is at a high level (e.g., near the top of the plot). The X axis represents time, and time increases from the left to the right.

At time $T_0$, the engine air-fuel is controlled around stoichiometric conditions so that exhaust gas conditions at a downstream three-way catalyst are also near stoichiometric conditions. The conversion efficiencies of the three-way catalyst are high when operated around stoichiometry. The upstream or pre particulate filter oxygen concentration follows the engine air fuel ratio signal since the exhaust gas oxygen concentration is related to engine air-fuel ratio. Further, the soot mass held within the particulate filter is less than the soot mass where it may be desirable to oxidize soot held within the particulate filter. Consequently, the particulate filter oxidation command is set at a low level so that operating conditions are not adjusted to accommodate oxidation of soot at the particulate filter. For example, the temperature of the particulate filter is not adjusted to a level where soot may be oxidized at the particulate filter.

At time $T_1$, the engine air-fuel ratio remains moving about stoichiometric conditions so that high efficiency of the downstream three-way catalyst is maintained. Further, the exhaust gas oxygen concentration as determined from an oxygen sensor located upstream of the particulate filter continues to follow a trajectory similar to the engine air-fuel ratio. The exhaust gas oxygen concentration as determined from an oxygen sensor located downstream of the particulate filter also continues to follow a trajectory similar to the engine air-fuel ratio. However, the estimated soot mass reaches soot mass level 204 which initiates a particulate filter soot oxidation process. Accordingly, the particulate filter oxidation command signal transitions to a high state at $T_1$.

Engine operating conditions may be adjusted when the particulate filter oxidation command signal is transitioned to a high state. For example, spark timing can be retarded and engine mass air flow increased so that conditions at the particulate filter may be more conducive for oxidation of soot held by the filter. In other examples, fuel injection timing may also be adjusted.

At time $T_2$, the engine air-fuel ratio and the exhaust gas oxygen concentration as determined from an oxygen sensor located upstream of the particulate filter continue to vary around stoichiometric conditions. However, the exhaust gas oxygen concentration as determined from an oxygen sensor located downstream of the particulate filter begins to attenuate as the particulate filter reaches a temperature conducive for oxidation of soot held within the particulate filter. Further, the estimated soot mass oxidized from the particulate filter may be updated as the soot mass oxidized is determined as is shown. Thus, in some examples the soot mass is stepped down as soot is oxidized in the trap as determined from the upstream and downstream oxygen sensors. The particulate filter oxidation command remains at a high level at time $T_3$.

Between times $T_2$ and $T_3$, the engine air-fuel ratio is modulated around stoichiometric conditions. For example, during a first portion of a time period, the engine air-fuel ratio is rich. During a second portion of a time period, the engine air-fuel is lean. However, the engine air-fuel is leaned to a greater extent as compared to when the engine was operated before time $T_2$. The engine air-fuel ratio is further leaned so that when the exhaust gases exit the particulate filter after oxidizing a portion of soot within the particulate filter, an exhaust gas mixture, on average, indicative of stoichiometric combustion enters the three-way catalyst located downstream of the particulate filter.

In other examples, additional air may be added to the exhaust system via an air pump or other device to increase the level of oxygen that enters the particulate filter so that excess oxygen is available to the three-way catalyst located downstream of the particulate filter. In examples where air is added to the exhaust system, the air can be periodically pulsed in response to oxygen entering and exiting the three-way catalyst.

The engine air-fuel ratio frequency of oscillation is shown being varied as is the duty cycle and the lean portion of the engine air-fuel ratio. The frequency of oscillation and the duty cycle of the engine air-fuel ratio may be adjusted in response to an estimated amount of oxygen stored within the catalyst and an estimated consumption rate of reductantants. For example, the lean portion of an engine air-fuel ratio cycle can be adjusted to a first amplitude when a soot mass estimated to be stored in a particulate filter is a first amount. The lean portion of the engine air-fuel cycle can be adjusted to a second amplitude when the soot mass estimated to be stored in the particulate filter is a second amount, the second amplitude less than the first amplitude (e.g., second amplitude richer than the first amplitude) when the first amount is greater than the second amount.

In some examples, the frequency, duty cycle, and amplitude of the lean portion of the engine air-fuel ratio is stored in controller memory and indexed via engine speed and engine load. However, if more or less oxygen than is expected exits the particulate filter, the duty cycle, frequency, and amplitude of the engine air-fuel ratio can be adjusted so that near stoichiometric exhaust gases are delivered to the downstream three-way catalyst.

In addition, as shown in FIG. 2, the lean amplitude, duty cycle, and frequency of the engine air-fuel ratio are adjusted in response to soot oxidized within the particulate filter as observed by a oxygen sensor located downstream of the particulate filter. For example, if excess oxygen beyond what is desired for the three-way catalyst located downstream of the particulate filter, the lean amplitude of the engine air-fuel ratio is decreased to richen the engine air-fuel ratio cycle. In another example, the lean amplitude, frequency of oscillation, and duty cycle of the engine air-fuel ratio are adjusted automatically as the controller determines that the soot mass oxidized approaches the soot mass held within the particulate filter. For example, each time the soot mass of the soot held within the particulate filter is lowered due to oxidation, the lean amplitude is decreased, the duty cycle is adjusted to reduce the lean portion of the engine air-fuel cycle, and the frequency may be decreased as well. Air entering the particulate filter from external the engine may be adjusted in a similar manner.

At time $T_3$, the particulate filter oxidation command is reset to a low level. The particulate filter oxidation command may be reset to a low level when a mass of air exiting the particulate filter is greater than expected after the lean amplitude of the air-fuel ratio has been decreased. In another example, the particulate filter oxidation command may be reset when the determined oxidized soot mass is greater than at threshold amount, seventy five percent of the estimated stored soot mass for example. The oxidized soot mass during such operation is determined from oxygen sensors positioned upstream and downstream of the particulate filter as described in the methods of FIGS. 3-5. Engine operating conditions are returned to operating conditions for fuel economy, emissions, and drivability after the particulate filter oxidation command is commanded off. Thus, spark can be advanced and engine air mass may be reduced in response to the particulate filter oxidation command being commanded off.

Figure 3:
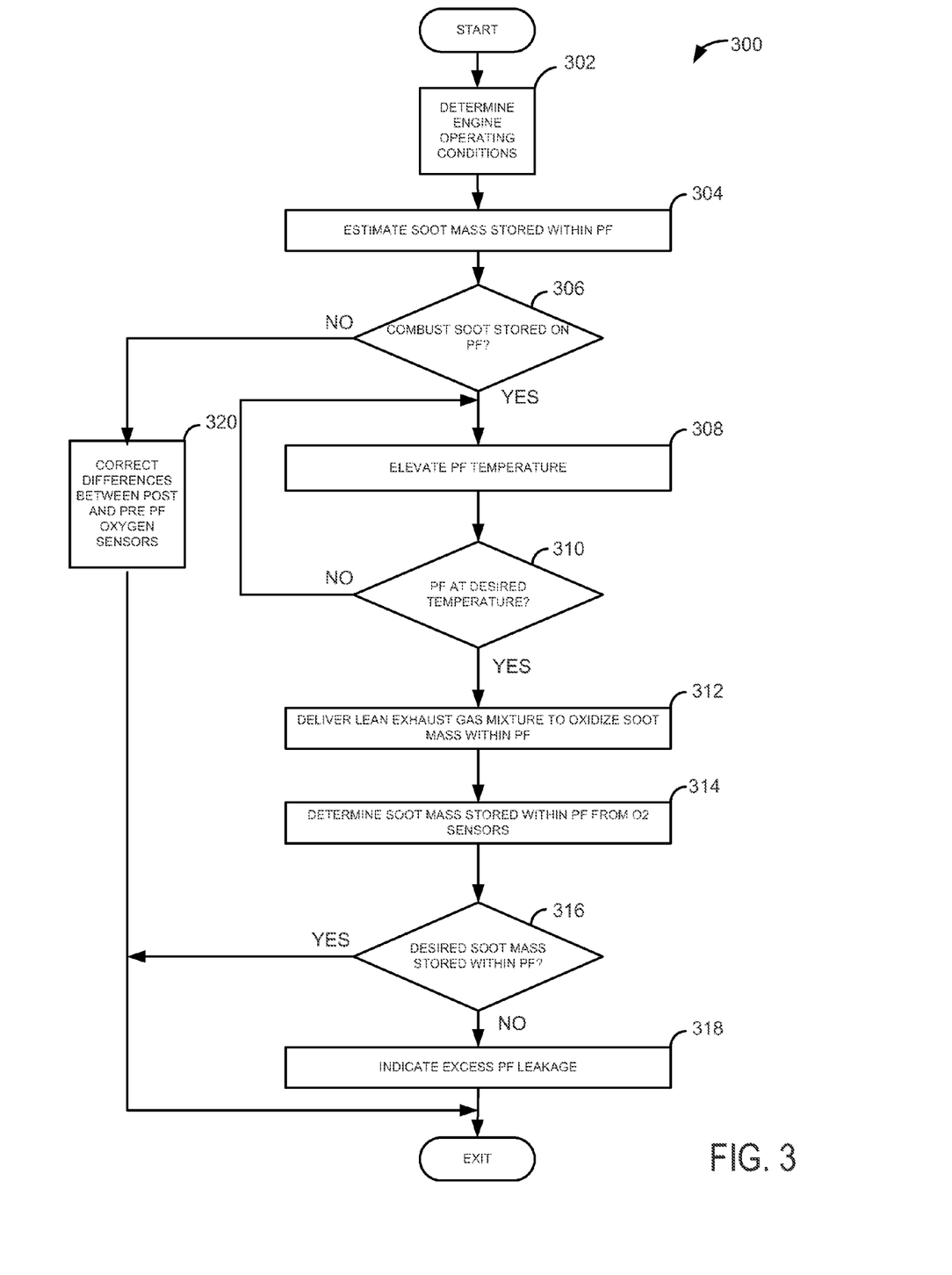
FIGS. 3-5 show high level flowcharts of methods for determining soot mass oxidized within a particulate filter and particulate filter leakage.

Referring now to FIG. 3, a method for determining soot mass oxidized within a particulate filter and particulate filter leakage is shown. The method of FIG. 3 is executable via instructions of controller 12 within the system of FIG. 1.

At 302, method 300 determines engine operating conditions. In one example, engine operating conditions include but are not limited to engine speed, engine load, exhaust gas oxygen concentration as measured from a plurality of locations in the engine exhaust system, engine coolant temperature, engine air amount, and fuel injection timing. Method 300 proceeds to 304 after engine operating conditions are determined.

At 304, method 300 estimates the soot mass stored within a particulate filter of the exhaust system. In one example, method 300 estimates the soot mass within the particulate filter from engine operating conditions including the amount of time the engine operated at the operating conditions. For example, engine air mass or engine load along with engine speed may be used to index a table that holds empirically determined soot mass flow rates. The soot mass flow rates may be integrated over time to estimate the amount of soot mass held within the particulate filter. In some examples, particulate filter efficiency may similarly be determined from a table that holds empirically determined particulate filter efficiencies.

At 306, method 300 judges whether or not to combust soot held within a particulate filter. If the soot mass within the particulate filter exceeds a predetermined amount, method 300 proceeds to 306. Otherwise, method 300 proceeds to exit. It should be noted that method 300 may exit or bypass the particulate filter combustion process in response to operating conditions other than soot mass held within the particulate filter. For example, method 300 may exit when a temperature of the particulate filter exceeds a predetermined threshold. In another example, method 300 exits in response to an operator requesting a torque that is greater than a predetermined value, or if exhaust pressure is greater than a predetermined value during combustion of the particulate filter soot mass.

At 308, method 300 elevates the temperature of the particulate filter. In one example, the particulate filter is elevated via increasing spark retard and engine air-flow rate. For example, spark may be retarded by a predetermined amount from base spark timing. Further, the engine air-flow can be increased so that the engine produces an equivalent amount of torque even while spark is retarded and while exhaust gas temperatures increase. In some examples, the exhaust gas temperature may be estimated from engine speed, engine air mass, and spark advance. Method 300 proceeds to 310 after particulate filter temperature is raised.

At 310, method 300 judges whether or not the particulate filter is at a desired temperature to facilitate combustion of soot mass held within the particulate filter. If so, method 300 proceeds to 312. Otherwise, method 300 returns to 308 where additional actions may be taken to increase particulate filter temperature. For example, additional spark retard may be provided.

Figure 4:
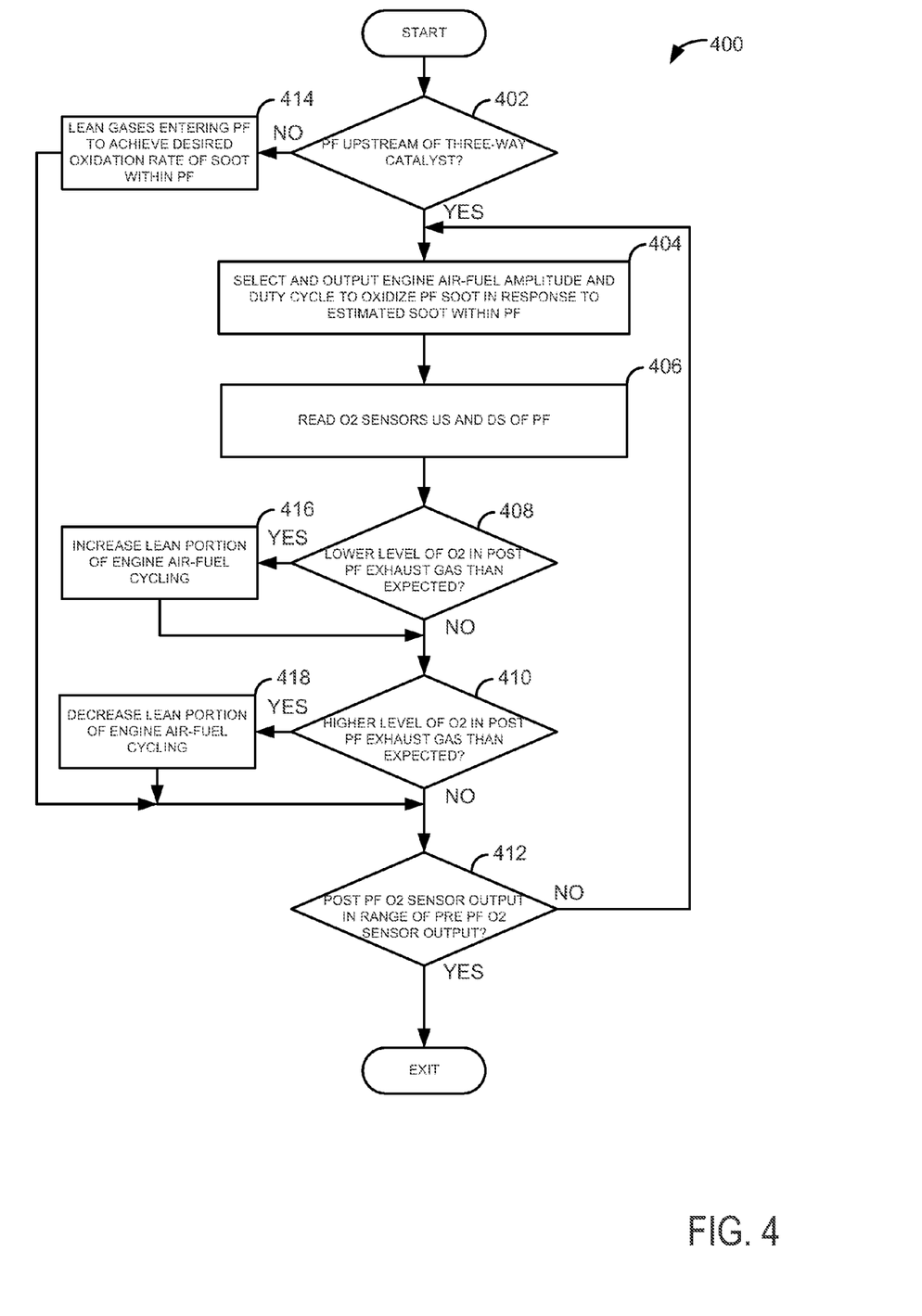

At 312, method 300 delivers a lean exhaust gas mixture to the particulate filter. In one example, the method of FIG. 4 provides a lean exhaust gas mixture. However, other methods may be employed in the alternative. Method 300 proceeds to 314 after a lean exhaust gas mixture is provided to the inlet of the particulate filter.

At 314, method 300 determines a soot mass stored within a particulate filter. In one example, the method of FIG. 5 determines the soot mass held within a particulate filter from oxygen sensors position in an exhaust system upstream and downstream of a particulate filter. In particular, the soot mass oxidized within a particulate filter is determined at least partially in response to a difference of oxygen concentration between two oxygen sensors. Method 300 proceeds to 316 after determining the soot mass oxidized from a particulate filter.

At 316, method determines whether a desired amount of soot was stored within the particulate filter. In one example, the soot mass determined at 314 is subtracted from the soot mass estimated at 304. If it has been determined that soot has been substantially removed from the particulate filter during the soot oxidation process, and that the result of the difference between the determined soot mass from the estimated soot mass is greater than a predetermined amount, method 300 proceeds to 318. Otherwise, method 300 proceeds to exit. Thus, if the estimated soot mass is less than the determined soot mass, method 300 proceeds to 318.

At 318, method 300 provides an indication of particulate filter leakage. In one example, particulate filter leakage is indicated via a light. In other examples, particulate filter leakage is indicated via a diagnostic code made available to a diagnostic tool. Method 300 proceeds to exit after providing an indication of particulate filter leakage.

At 320, method 300 corrects differences that may develop between the output of oxygen sensors located upstream and downstream of a particulate filter. In one example, where there is an offset difference between the upstream oxygen sensor and the downstream oxygen sensor, one or the other of the upstream and downstream sensors is selected as a baseline and an offset is determined by subtracting the output of the baseline sensor from the output of the other sensor. The result of the subtraction is then added to the output of the other sensor to correct the difference between sensor outputs. In other examples, where one sensor responds faster than the other sensor the phase difference can be accounted for by post processing the oxygen concentration data. The phase differences may be determined and stored in memory so that phase of the slower sensor can be adjusted according to the phase difference between the faster and the slower sensor. Phase of the slower oxygen sensor may be adjusted by post processing stored oxygen concentration data and passing the data through a filter than corrects for the phase difference between sensors.

It should be noted that differences in oxygen sensor output are corrected when a temperature of the particulate filter is less than a predetermined temperature so that oxidation of soot within the particulate does not affect correcting oxygen sensor output. Further, in some examples, the correction of oxygen sensor output may be reserved for selected operating conditions. For example, when engine speed is greater than a threshold speed and when engine air mass flow is greater than a threshold amount.

Referring now to FIG. 4, a method for delivering a lean exhaust gas mixture to oxidize soot mass held within a particulate filter is shown. The method of FIG. 4 is executable via instructions of controller 12 within the system of FIG. 1.

At 402, method 400 judges whether or not a particulate filter is positioned in an exhaust system at a location upstream of a three-way catalyst. In one example, the vehicle exhaust system configuration may be stored in memory so that a simple enquiry provides an answer to the particulate filter location. Method 400 proceeds to 414 if the particulate filter is not located upstream of a three-way catalyst. Otherwise, method 400 proceeds to 404.

At 414, method 400 leans gases entering a particulate filter to achieve a desired rate of soot oxidation within the particulate filter. If air is injected into the exhaust system at a location upstream of the particulate filter the amount of air injected to the exhaust system can be adjusted in response to a temperature of the particulate filter. In some examples, air may be injected to an engine exhaust system in a series of pulses so that a temperature of the particulate filter can be controlled. Method 500 proceeds to 412 after air entering the particulate filter is adjusted.

At 404, method 400 selects and outputs engine air-fuel ratio amplitude, duty cycle, and frequency for oxidizing soot held within the particulate filter. The air-fuel ratio amplitude, duty cycle, and frequency may be adjusted via changing an amount of fuel injected to each engine cylinder. For example, if it is desired that a lean air-fuel mixture is combusted by the engine, less fuel may be injected to a cylinder. The duty cycle of rich or lean cylinder air-fuel mixtures may be adjusted by varying a number of combustion events for a cylinder when the cylinder combusts a lean or rich air-fuel mixture. In one example, the amount that a cylinder air-fuel mixture is lean may be varied according to the estimated amount of soot held within the particulate filter. For example, if it is estimated that 0.2 grams of soot are stored within the particulate filter, engine cylinders may be operated 0.2 air-fuel ratios leaner than a base commanded engine air-fuel ratio during the lean portion of the base commanded engine air-fuel ratio cycle. On the other hand, if it is estimated that 0.4 grams of soot are stored within the particulate filter, engine cylinders may be operated 0.4 air-fuel ratios leaner than a base commanded engine air-fuel ratio during the lean portion of the base commanded engine air-fuel ratio cycle.

The frequency, rich and lean air-fuel ratio amplitudes about a stoichiometric air-fuel ratio, and air-fuel ratio duty cycle are adjusted to provide a substantially stoichiometric exhaust gas mixture entering the downstream three-way catalyst. Further, the engine air-fuel ratio frequency, rich and lean air-fuel ratio amplitudes, and air-fuel ratio duty cycle are adjusted at 416 and 418 to account for soot mass oxidized. Method 400 proceeds to 406 after the engine air-fuel ratio is adjusted and output.

At 406, method 400 reads the output of upstream (US) and downstream (DS) oxygen sensors. The oxygen sensor outputs may be read once or several times before proceeding to 408. Method 400 proceeds to 408 after the outputs of oxygen sensors are read.

At 408, method 400 judges whether or not a lower level of oxygen than is expected is present in the exhaust gases exiting the particulate filter. A level of oxygen that is lower than is expected may indicate that more soot mass than is estimated is stored within the particulate filter. However, the lower level of oxygen may disturb the chemistry within the three-way catalyst so that oxidation of hydrocarbons and carbon monoxide is efficient. Therefore, the amplitude of the lean portion of the engine air-fuel ratio cycle may be increased so that additional oxygen may pass through the particulate filter and participate in oxidation within the three-way catalyst. In one example, the level of oxygen is lower than expected, when on average over an engine air-fuel ratio cycle, the exhaust gases exiting the particulate filter are richer than a stoichiometric mixture. If method 400 judges that the level of oxygen in gases exiting the particulate filter is less than expected, method 400 proceeds to 416. Otherwise, method 400 proceeds to 410.

At 416, method 400 increases the lean portion of an engine air-fuel ratio cycling pattern. In one example, the lean portion of the air-fuel cycle is leaned by injecting less fuel over a number of combustion events. In other examples, the engine air amount can be increased while the engine fuel amount remains substantially constant. Method 400 proceeds to 410 after the amplitude of the lean portion of the engine air-fuel cycle is increased.

At 410, method 400 judges whether or not a higher level of oxygen than is expected is present in the exhaust gases exiting the particulate filter. A level of oxygen that is higher than expected it may indicate that less soot mass than is estimated is stored within the particulate filter. However, the higher level of oxygen may disturb the chemistry within the three-way catalyst so that reduction of NOx is less efficient. Therefore, the amplitude of the lean portion of the engine air-fuel ratio cycle may be decreased so that less oxygen may pass through the particulate filter and participate in oxidation within the three-way catalyst. In one example, the level of oxygen is higher than expected, when on average over a time period, the exhaust gases exiting the particulate filter are leaner than a stoichiometric mixture. If method 400 judges that the level of oxygen in gases exiting the particulate filter is greater than expected, method 400 proceeds to 418. Otherwise, method 400 proceeds to 412.

At 418, method 400 decreases the lean portion of an engine air-fuel ratio cycling pattern. In one example, the lean portion of the air-fuel cycle is richened by injecting more fuel over a number of combustion events. In other examples, the engine air amount can be decreased while the engine fuel amount remains substantially constant. Method 400 proceeds to 412 after the amplitude of the lean portion of the engine air-fuel cycle is increased.

In an alternative example, the lean amplitude, frequency of oscillation, and duty cycle of the engine air-fuel ratio are adjusted automatically as the controller determines that the soot mass oxidized approaches the soot mass held within the particulate filter. Thus, 408, 410, 416, and 418 may be replaced with an operation where the lean portion of the engine air-fuel cycle is decreased as an estimated soot mass held within the particulate filter decreases.

At 412, method 400 judges whether or not the output of a downstream oxygen sensor is in range of the output of an upstream oxygen sensor. If so, the process of oxidation of soot within the particulate filter is stopped and the engine is returned to base operating conditions. Otherwise, method 400 returns to 404. In this example, when the downstream oxygen sensor indicates an oxygen concentration similar to that indicated by the upstream oxygen sensor while the engine is operating lean and while the particulate filter is at an elevated temperature, it may be determined that a substantial portion soot mass held within the particulate filter has been oxidized.

In an alternative example, method 400 can exit when soot mass determined from upstream and downstream oxygen sensor signals is subtracted from the estimated soot mass held within the particulate filter and the result is less than a threshold soot mass. If the result of subtracting the soot mass determined from oxygen sensors subtracted from the estimated soot mass held within the particulate filter is greater than the threshold soot mass, method 400 returns to 404.

In this way, the exhaust gases supplied to the particulate filter and the downstream catalyst can be controlled to both oxidize soot in the particulate filter and balance the chemistry within the downstream catalyst for efficient oxidation and reduction. Further, the soot mass can be readily determined from processing and summing the differences in the corrected oxygen sensor output as described in the method of FIG. 5. In other examples, the air amount entering the particulate filter can be adjusted without adjusting the engine air-fuel amount. For example, air can be periodically added to the particulate filter via an air pump during the process of oxidizing soot mass held within the particulate filter. In such cases, the amount of air entering the particulate filter can be cycled so that, on average, a stoichiometric mixture of gas exits the particulate filter.

Figure 5:
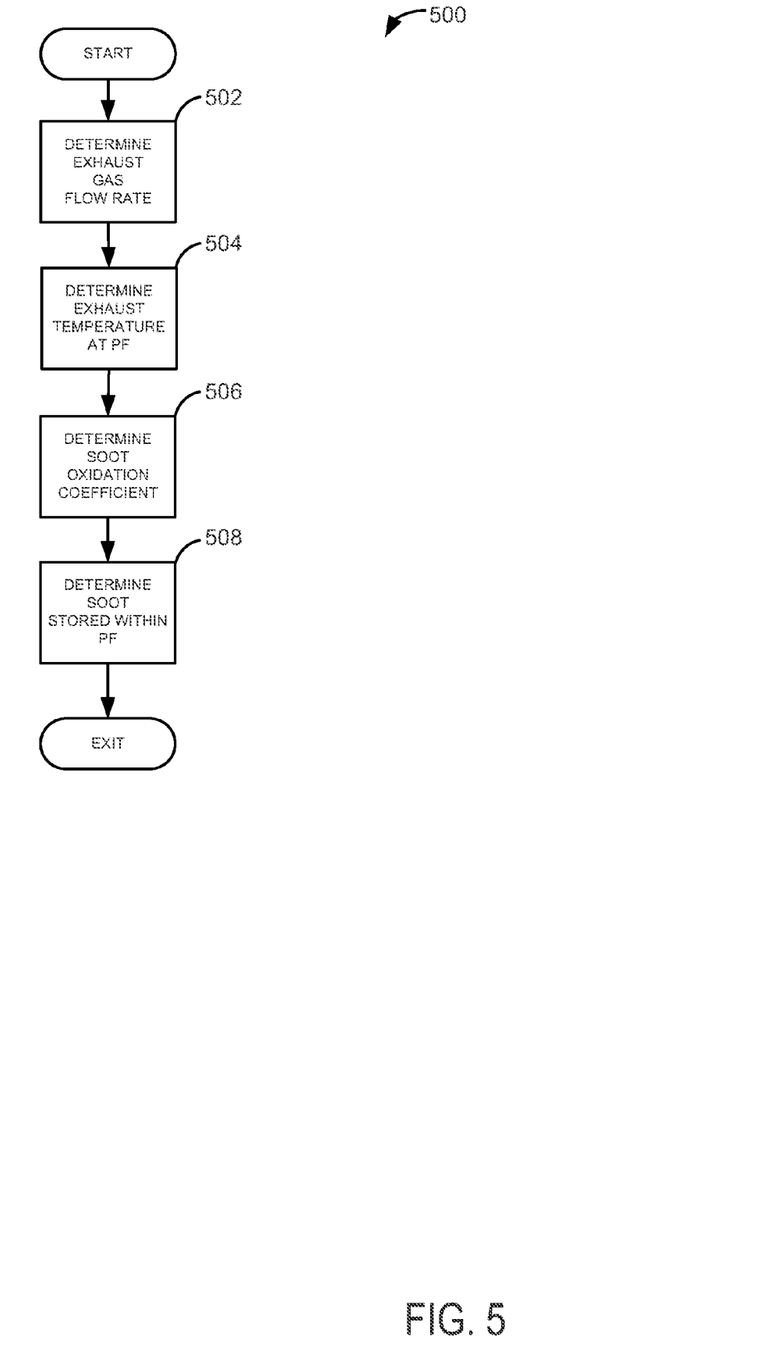

Referring now to FIG. 5, a high level flowchart of a method for determining soot mass oxidized is shown. The method of FIG. 5 is executable via instructions of controller 12 within the system of FIG. 1.

At 502, method 500 determines the engine exhaust gas flow rate. In one example, the engine exhaust gas flow rate can be determined from the engine air mass flow rate.

And, the engine air mass flow rate can be determined from an air mass sensor or from engine speed, manifold pressure, and the ideal gas law. In other examples, the exhaust mass flow rate can be determined by a combination of engine air mass flow rate and an estimation of an amount of air external to the engine being pumped into the exhaust system. For example, engine air mass can be determined from a mass air flow sensor and the external air mass can be estimated from a voltage applied to an air pump. Method 500 proceeds to 504 after the exhaust gas mass flow rate is determined.

At 504, method 500 determines a temperature at the particulate filter. In one example, particulate filter temperature may be determined via a temperature sensor. In another example, particulate filter temperature may be determined from engine air mass, spark timing, and engine speed via a model. Method 500 proceeds to 506 after the particulate filter temperature is determined.

At 506, method 500 determines a soot oxidation coefficient related to molecular collisions. The soot oxidation coefficient may be empirically determined via experimentation. Further, the soot coefficient may vary for different operating conditions. In one example, the soot oxidation coefficient may be empirically determined and stored in memory of a controller. Where multiple soot coefficients are used, a table or function may be indexed via a variable such as particulate filter temperature to determine a soot coefficient. Method 500 proceeds to 508 after the soot coefficient is determined.

At 508, method 500 determine the soot mass oxidized during the soot mass oxidation process. In one example, the soot mass oxidized is determined according to an Arrhenius equation. In particular, soot mass oxidized from a particulate filter is determined according to the following equations:

$$\frac{d\text{m\_soot}}{dt} = -\text{m\_soot} \cdot O_2 \cdot k_0 \cdot e^{\left(\frac{-k}{RT}\right)} \quad (1)$$

$$O_2\text{\_downstreamPF} = O_2\text{\_upstreamPF} - k_1 \cdot \frac{\left(\frac{d\text{m\_soot}}{dt}\right)}{\text{exh\_flow}} \quad (2)$$

Where m_soot is soot mass, $O_2$ is amount of oxygen available to oxidize soot, $k_0$ is a soot oxidation coefficient related to a molecular collision rate, k is activation energy, R is the gas constant, and T is absolute temperature in equation 1. And, where $O_2$_downstreamPF is the corrected oxygen concentration downstream of the particulate filter, $O_2$_upstreamPF is the corrected oxygen concentration upstream of the particulate filter, $k_1$ is an empirically determined coefficient, m_soot is soot mass, and exh_flow is exhaust gas flow rate. The soot mass oxidized is updated each time the oxygen sensors located upstream and downstream of the particulate filter are read.

In examples where a three-way catalyst is positioned between a particulate filter and a downstream oxygen sensor, the amount of oxygen stored in the three-way catalyst is considered when determining the amount of soot oxidized by the particulate filter. In particular equation 2 above is modified to include the amount of oxygen stored within the catalyst.

$$O_2\text{\_downstreamPF} = O_2\text{\_upstreamPF} - k_1 \cdot \frac{\left(\frac{d\text{m\_soot}}{dt}\right)}{\text{exh\_flow}} - O_2\text{\_catalyst} \quad (3)$$

Where $O_2$_catalyst is an amount of oxygen stored within a catalyst located downstream of the particulate filter. In one example, the amount of oxygen stored within a catalyst may be determined according to the method described in U.S. Pat. No. 6,453,662 which is hereby fully incorporated by reference for all intents and purposes. Again, the soot mass oxidized is updated each time the oxygen sensors are read. Method 500 exits after updating the soot mass oxidized during the soot mass oxidation procedure.

In this way, the soot mass oxidized during a particulate filter soot mass oxidation procedure may be determined. By utilizing information provided by oxygen sensors upstream and downstream of the particulate filter it is possible to determine the soot mass oxidized within a particulate filter.

Thus, the method of FIGS. 3-5 provide for a method for operating a particulate filter, comprising: estimating soot mass oxidized from a particulate filter via first and second oxygen sensors; and indicating degradation of the particulate filter when a difference between the estimated soot mass oxidized from the particulate filter and a desired soot mass held in the particulate filter is greater than a threshold soot mass. The method includes where the first oxygen sensor is positioned in an exhaust system upstream of the particulate filter, and where the second oxygen sensor is positioned downstream of the particulate filter in the exhaust system. In this way, the oxygen consumed via oxidation of soot may be determined. The method also includes where the soot mass is estimated via an Arrhenius equation. The method includes where the first oxygen sensor is located upstream of the particulate filter and where the second oxygen sensor is located downstream of the particulate filter. The method includes where the first and second oxygen sensors are linear oxygen sensors. The method also includes where an output of at least one of the first and second oxygen sensors is compensated during a soot oxidation process of the particulate filter in response to a difference between output of the first oxygen sensor and output of the second oxygen sensor during a period of time when oxidation of soot within the particulate filter is not expected. The method includes where compensation is provided to at least one of the first and second oxygen sensors via adding an offset to an output of the first or second oxygen sensor. Thus, oxygen sensor errors can be extracted from the estimate of particulate filter soot mass.

The methods of FIGS. 3-5 further provide for a method for operating a particulate filter, comprising: adjusting a lean portion of an engine air-fuel ratio cycle in response to soot mass held within a particulate filter; and indicating degradation of the particulate filter when a difference between an estimated soot mass oxidized from the particulate filter via first and second oxygen sensors, and a desired soot mass held in the particulate filter, is greater than a threshold soot mass. The method includes where the lean portion of the engine air-fuel ratio cycle is further adjusted in response to an output of the second oxygen sensor, and where the second oxygen sensor is located downstream of the particulate filter. In this way, a high conversion efficiency of a three-way catalyst located downstream of the particulate filter can be provided. The method includes where a three-way catalyst is positioned in an engine exhaust system downstream of the particulate filter and an engine, and where the engine is a spark ignition engine. The method also includes where the lean portion of the engine air-fuel ratio cycle is further leaned when an oxygen concentration output from the second oxygen sensor is less than expected. In another example, the method includes where the lean portion of the engine air-fuel ratio cycle is richened when and oxygen concentration output from the second oxygen sensor is higher than expected. The method further comprises adjusting a duty cycle of the engine air-fuel ratio cycle in response to an output of the second oxygen sensor, the second oxygen sensor positioned in an exhaust system downstream of the particulate filter. The method also further comprises ceasing to estimate the soot mass oxidized from the particulate filter in response to the output of the second oxygen sensor.

The methods of FIGS. 3-5 further provide for a method for operating a particulate filter, comprising: adjusting a lean portion of an engine air-fuel ratio cycle in response to soot mass held within a particulate filter; initiating combustion of an air-fuel mixture in a cylinder of an engine via a spark, the air-fuel mixture derived from the air-fuel ratio cycle; estimating soot mass oxidized from the particulate filter via first and second oxygen sensors; and indicating degradation of the particulate filter when a difference between the estimated soot mass a desired soot mass is greater than a threshold soot mass. The method also includes where an output of at least one of the first and second oxygen sensors is compensated during a soot oxidation process of the particulate filter in response to a difference between an output of the first oxygen sensor and an output of the second oxygen sensor during a period of time when oxidation of soot within the particulate filter is not expected. The method also includes where compensation includes compensation for signal phase delay between the first and second oxygen sensors. In one example, the method includes where compensation further includes compensation for an offset difference between the output of the first oxygen sensor and an output of the second oxygen sensor. The method also includes where a three-way catalyst is located in an exhaust system of an engine downstream of the particulate filter. The method further comprises where the engine air-fuel ratio cycle is adjusted to provide on average a substantially stoichiometric mixture of exhaust gases exiting the particulate filter.

As will be appreciated by one of ordinary skill in the art, the methods described in FIGS. 3-5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a particulate filter, comprising:
    estimating soot mass oxidized from a particulate filter via first and second oxygen sensors; and
    indicating degradation of the particulate filter when a difference between the estimated soot mass oxidized from the particulate filter and a soot mass held in the particulate filter before the soot mass is oxidized from the particulate filter is greater than a threshold soot mass, and where the estimated soot mass oxidized from the particulate filter is based on the first oxygen sensor, the second oxygen sensor, and an oxygen storage estimate of a three-way catalyst.

2. The method of claim 1, where the first oxygen sensor is positioned in an exhaust system upstream of the particulate filter, and where the second oxygen sensor is positioned downstream of the particulate filter in the exhaust system.

3. The method of claim 1, where the soot mass is estimated via an Arrhenius equation.

4. The method of claim 1, where the first oxygen sensor is located upstream of the particulate filter and where the second oxygen sensor is located downstream of the particulate filter and the three-way catalyst.

5. The method of claim 4, where the first and second oxygen sensors are linear oxygen sensors.

6. The method of claim 1, where an output of at least one of the first and second oxygen sensors is compensated during a soot oxidation process of the particulate filter based on a difference between output of the first oxygen sensor and output of the second oxygen sensor during a period of time when oxidation of soot within the particulate filter is not expected.

7. The method of claim 6, where compensation is provided to at least one of the first and second oxygen sensors via adding an offset to the output of the at least one of the first and second oxygen sensors.

8. A method for operating a particulate filter, comprising:
    adjusting a lean portion of an engine air-fuel ratio cycle in response to a soot mass held within a particulate filter;
    adjusting a frequency of the engine air-fuel ratio cycle in response to an oxygen sensor located downstream of the particulate filter; and
    indicating degradation of the particulate filter when a difference between an estimated soot mass oxidized from the particulate filter via an oxygen sensor located upstream of the particulate filter and the oxygen sensor located downstream of the particulate filter, and the soot mass held in the particulate filter, is greater than a threshold soot mass.

9. The method of claim 8, where the lean portion of the engine air-fuel ratio cycle is further adjusted in response to an output of the second oxygen sensor.

10. The method of claim 9, where a three-way catalyst is positioned in an engine exhaust system downstream of the particulate filter and an engine, and where the engine is a spark ignition engine.

11. The method of claim 9, where the lean portion of the engine air-fuel ratio cycle is further leaned when an oxygen concentration output from the second oxygen sensor is less than expected.

12. The method of claim 9, where the lean portion of the engine air-fuel ratio cycle is enriched when an oxygen concentration output from the second oxygen sensor is higher than expected.

13. The method of claim 8, further comprising adjusting a duty cycle of the engine air-fuel ratio cycle in response to an output of the second oxygen sensor, the second oxygen sensor positioned in an exhaust system downstream of the particulate filter.

14. The method of claim 13, further comprising ceasing to estimate the soot mass oxidized from the particulate filter in response to the output of the second oxygen sensor.

15. A method for operating a particulate filter, comprising:
adjusting a lean portion of an engine air-fuel ratio cycle in response to a soot mass held within a particulate filter;
initiating combustion of an air-fuel mixture in a cylinder of an engine via a spark during regeneration of the particulate filter, the air-fuel mixture derived from the air-fuel ratio cycle;
estimating soot mass oxidized from the particulate filter via first and second oxygen sensors;
compensating an output of at least one of the first and second oxygen sensors during a soot oxidation process of the particulate filter based on a difference between an output of the first oxygen sensor and an output of the second oxygen sensor during a period of time when oxidation of soot within the particulate filter is not expected; and
indicating degradation of the particulate filter when a difference between the estimated soot mass and the soot mass is greater than a threshold soot mass.

16. The method of claim 15, further comprising exiting regeneration of the particulate filter when exhaust pressure exceeds a threshold pressure.

17. The method of claim 15, where compensation includes compensation for signal phase delay between the first and second oxygen sensors.

18. The method of claim 17, where compensation further includes compensation for an offset difference between the output of the first oxygen sensor and an output of the second oxygen sensor.

19. The method of claim 15, where a three-way catalyst is located in an exhaust system of the engine downstream of the particulate filter.

20. The method of claim 15, further comprising where the engine air-fuel ratio cycle is adjusted to provide on average a substantially stoichiometric mixture of exhaust gases exiting the particulate filter.

* * * * *